(12) United States Patent
Detlefs

(10) Patent No.: US 6,223,340 B1
(45) Date of Patent: Apr. 24, 2001

(54) METHOD FOR DIRECTLY INLINING VIRTUAL CALLS WITHOUT ON-STACK REPLACEMENT

(75) Inventor: David L. Detlefs, Westford, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/169,341

(22) Filed: Oct. 9, 1998

(51) Int. Cl.$^7$ ........................................... G06F 9/45

(52) U.S. Cl. ............................ 717/5; 717/9; 717/7

(58) Field of Search .................. 717/5, 7, 9; 117/207, 117/163

(56) References Cited

U.S. PATENT DOCUMENTS

| | | | |
|---|---|---|---|
| 5,339,419 | * 8/1994 | Chan et al. ........................ | 717/7 |
| 5,481,708 | 1/1996 | Kukol ............................... | 717/9 |
| 5,579,518 | 11/1996 | Yasumatsu ....................... | 717/5 |
| 5,815,719 | 9/1998 | Goebel ............................. | 717/7 |
| 5,835,771 | * 11/1998 | Veldhuizen ...................... | 717/5 |
| 5,845,331 | 12/1998 | Cartel et al. .................... | 711/163 |
| 6,003,123 | 12/1999 | Cartel et al. .................... | 711/207 |
| 6,161,217 | * 12/2000 | Detlefs et al. .................. | 717/5 |

OTHER PUBLICATIONS

Ti: Windows development Microsoft debuts C/C++ 7.0 development systems for windows 3.1; high performance object technology smallest, fastest code for windows 3.0, Pub: Edge Publishing, Mar. 2, 1992.*

Title: Java profiling tools can keep apps humming in tune, SO: InfoWorld, (Sep. 14, 1998) pp. 74.*

Title: Using Borland C++, AU : Atkinson, Lee Atkinson, Mark, SO: Carmel, IN: Que Corporation. 1991. 1068 p.*

Chambers et al., An Efficient Implementation of SELF, a Dynamically–Typed Object–Orientated Language Based on Prototypes, published in OOPSLA '89, Vol 24, No. 10, pp. 40–70.

Fernandez, Simple and Effective Link–Time Optimization of Modula–3 Programs, Nov. 7, 1994, pp. 1–17.

Hölzle et al., Optimizing Dynamically–Typed Object–Orientated Languages with Polymorphic Inline Caches, published in ECOOP '91 Proceedings Jul., 1991, pp. 1–18.

Hölzle et al., Debugging Optimized Code with Dynamic Deoptimization, published in ACM SIGPLAN '92, Jun. 1992, pp. 1–12.

(List continued on next page.)

Primary Examiner—Mark R. Powell
Assistant Examiner—Chameli Chaudhuri Das
(74) Attorney, Agent, or Firm—Cesari and McKenna, LLP

(57) ABSTRACT

A dynamic compiler determines whether to inline methods in place of virtual method calls by inspecting such calls' receiver expressions. If a given call site meets other criteria for inlining, the method is inlined if its receiver expression can be proved to have a property called "pre-existence." One kind of expression whose pre-existence is easily proved is a calling-procedure argument to which the body of the calling procedure makes no assignment. One of the other criteria is that the argument's static type is a class whose definition of the callee method has not been overridden, and the compiler employs a dependency data structure to record against both the caller and the callee that the caller contains code whose validity depends on the assumption that this criterion has been met. If the compiler thereafter compiles another implementation of the callee method, it inspects the dependency structures in which dependencies have been recorded against the callee method, and it recompiles the callers whose object code's validity is indicated by such structures to depend on that callee method's not having been overridden. The restriction of inlining to pre-existing receiver expression allows currently running invocations of the original compilation of the caller method to continue without fear of error.

40 Claims, 8 Drawing Sheets

OTHER PUBLICATIONS

Chambers et al., Making Pure Object–Orientated Languages Pratical, published in OOPSLA '91 Conference Proceedings, Oct. 1992, pp. 1–15.

Chambers et al., A Framework for Selective Recomplication in the Presence of Complex Intermodule Dependencies, Department of Computer Science and Engineering, University of Washington.

Ungar et al., Aritecture of SOAR: Smalltalk on a RISC, Proceedings of the Annual International Symposium on Computer Arichecture, vol. 11, 1984, pp. 188–197.

Deutsch et al., Effiicient Implementation of the Smalltalk–80 System, Conference Record of the 11th Annual ACM Symposium in Plinciples of Programming Languages, 1984, pp. 297–302.

Jordan, David, Implementation Benefits of C++ Language Mechanisms, Communications of the ACM Sep. 1990 vol. 33, No. 9., pp. 61–64.

Driesen et al., The Direct Cost of Virtual Function Calls in C++, OOPSLA '96, pp. 306–323.

Piumarta et al., Optimizing Direct Threaded Code by Selective Inlining, ACM 1998, pp. 291–300.

Dolby et al., An Evaluation of Automatic Object Inline Allocation Techniques, ACM 1998, pp. 1–20.

Detlefs et al., Inlining of Virtual Methods, ECOOP '99, pp. 1–21.

* cited by examiner

```
void m1(O o) {
    o.m2();
    O o2 = o;
    o2.m2();
    O o3 = o.clone();
    o3.m2();
    o.f.m3();
}
```

```
class O {
    private F f;
    private int count;
    public O (F f) {
        this.f = f;
    }
    void m2() {count = count + 1;}
}
```

```
class A {
        public float w;
        public float h;
        public float m1() {        // Defines member method
                return w*h;
        }
        .
        .
        .
} class B extends A {        // Inherits w, h, and m1
        float d;
} class C extends A {
        float m₁() {        // Overrides m1
                return w*h/2;
        }
        .
        .
        .
}
```

FIG. 3

```
                                        class X {
                                                .
                                                .
                                                .
                                        static void foo(A o) {
A a = new A();                                  float area;
a.h = 4;                                        area = o.m1();
a.w = 2;                                        .
X.foo(a);                                       .
                                                .
                                        }
                                                .
                                                .
                                                .
                                        }
```

FIG. 4

METHOD FOR DIRECTLY INLINING VIRTUAL CALLS WITHOUT ON-STACK REPLACEMENT

BACKGROUND OF THE INVENTION

The present invention is directed to compiling computer programs. It particularly concerns so-called inlining of virtual methods.

FIG. 1 depicts a typical computer system 10. A microprocessor 12 receives data, and instructions for operating on them, from on-board cache memory or further cache memory 18, possibly through the mediation of a cache controller 20, which can in turn receive such data from system read/write memory ("RAM") 22 through a RAM controller 24, or from various peripheral devices through a system bus 26.

The RAM 22's data and instruction contents will ordinarily have been loaded from peripheral devices such as a system disk 27. Other sources include communications interface 28, which can receive instructions and data from other computer systems.

The instructions that the microprocessor executes are machine instructions. Those instructions are ultimately determined by a programmer, but it is a rare programmer who is familiar with the specific machine instructions in which his efforts eventually result. More typically, the programmer writes higher-level-language "source code" from which a computer software-configured to do so generates those machine instructions, or "object code."

FIG. 2 represents this sequence. FIG. 2's block 30 represents a compiler process that a computer performs under the direction of compiler object code. That object code is typically stored on the system disk 27 or some other machine-readable medium and by transmission of electrical signals is loaded into the system memory 24 to configure the computer system to act as a compiler. But the compiler object code's persistent storage may instead be in a server system remote from the machine that performs the compiling. The electrical signals that carry the digital data by which the computer systems exchange the code are exemplary forms of carrier waves transporting the information.

The compiler converts source code into further object code, which it places in machine-readable storage such as RAM 24 or disk 27. A computer will follow that object code's instructions in performing an application 32 that typically generates output from input. The compiler 30 is itself an application, one in which the input is source code and the output is object code, but the computer that executes the application 32 is not necessarily the same as the one that performs the compiler process.

The source code need not have been written by a human programmer directly. Integrated development environments often automate the source-code-writing process to the extent that for many applications very little of the source code is produced "manually." Also, it will become apparent that the term compiler is used broadly in the discussions that follow, extending to conversions of low-level code, such as the byte-code input to the Java™ virtual machine, that programmers almost never write directly. (Sun, the Sun Logo, Sun Microsystems, and Java are trademarks or registered trademarks of Sun Microsystems, Inc., in the United States and other countries.) Moreover, although FIG. 2 may appear to suggest a batch process, in which all of an application's object code is produced before any of it is executed, the same processor may both compile and execute the code, in which case the processor may execute its compiler application concurrently with—and, indeed, in a way that can be dependent upon—its execution of the compiler's output object code.

The various instruction and data sources depicted in FIG. 1 constitute a speed hierarchy. Microprocessors achieve a great degree of their speed by "pipelining" instruction execution: earlier stages of some instructions are executed simultaneously with later stages of previous ones. To keep the pipeline supplied at the resultant speed, very fast on-board registers supply the operands and offset values expected to be used most frequently. Other data and instructions likely to be used are kept in the on-board cache, to which access is also fast. Signal distance to cache memory 18 is greater than for onboard cache, so access to it, although very fast, is not as rapid as for on-board cache.

Next in the speed hierarchy is the system RAM 22, which is usually relatively large and therefore usually consists of relatively inexpensive, dynamic memory, which tends to be significantly slower than the more-expensive, static memory used for caches. Even within such memory, though, access to locations in the same "page" is relatively fast in comparison with access to locations on different pages. Considerably slower than either is obtaining data from the disk controller, but that source ordinarily is not nearly as slow as downloading data through a communications link 28 can be.

The speed differences among these various sources may span over four orders of magnitude, so compiler designers direct considerable effort to having compilers so organize their output instructions that they maximize high-speed-resource use and avoid the slowest resources as much as possible. This effort is complicated by the common programming technique of dividing a program up into a set of procedures directed to respective specific tasks.

Much of that complication results from procedures that invoke other, lower-level procedures to accomplish their work. That is, various "caller" procedures transfer control to a common, "callee" procedure in such a way that when the callee exits it returns control to whatever procedure called it. From the programmer's viewpoint, this organization is advantageous because it makes code writing more modular and thus more manageable. It also provides for code re-use: a common procedure need not be copied into each site at which it is to be used. This means that any revisions do not have to be replicated at numerous places. But such an organization also adds overhead: the caller's state must be stored, cache misses and page faults can occur, and processor pipelines often have to be flushed. In other words, the system must descend the speed hierarchy.

So optimizing compilers often "inline" short or frequently used procedures: they copy the procedure's body—without the procedure prolog and epilog—into each site at which the source code calls it. In other words, the compiler may sacrifice re-use for performance. But the programmer still benefits from code-writing modularity. Inlining has an additional important benefit: compiling the inlined procedure in a specific calling context exposes more information to an optimizing compiler and thereby allows the optimizer to generate more-efficient machine code.

Certain of the more-modern programming languages complicate the inlining process. To appreciate this, recall the basic features of object-oriented languages. In such languages, of which the Java programming language and C++ are examples, the code is written in terms of "objects," which are instances of "classes." A class's definition lists the "members" of any object that is an instance of the class. A member can be a variable. Or it can be a procedure, which in this context is typically called a "method."

FIG. 3 illustrates a way in which one may employ the Java programming language to define classes. Its first code segment defines objects of a class A as including, among other things, respective floating-point-variable members h and w and a method member m1 that (in the example) operates on the object's member variables to return a floating-point value representing their product. Every instance of class A will have its respective member variables h and w, and there will also be a method whose name is m1 that can be called on that instance (although, as will be discussed below, that method may not perform the same operation for all instances).

FIG. 4 illustrates m1's use. Being a class member, method m1 can be invoked only by being "called on" an instance of that class. So the first statement of FIG. 4's left code fragment declares variable a to contain a reference to an object of class A. It also allocates memory to an object of that class and initializes variable a with a reference to the newly allocated class A object. The two statements after that place values in that object's two member variables. The last statement passes the object reference in variable a to a procedure X.foo.

This object reference can be passed to that procedure because, as the right code fragment indicates, foo was defined as having a parameter of type A, and variable a belongs to that class. As that code indicates, foo's definition calls method m1 on its parameter o. This is legal because a method of that name is a member of class A. So when the object reference in variable a is passed to procedure foo, method m1 is performed on that object's values of variables h and w.

A central feature of such object-oriented languages is "inheritance." One can declare in a new class definition that the new class is a "child" of another, "parent" class. The extends keyword in FIG. 3's definition of class B declares that class's child relationship to class A. This means that all objects of class B are considered also to be objects of the parent class, although the reverse is not necessarily true. Since they also belong to class A, all objects of class B will include respective values of member variables h and w and can have method m1 called on them. This is true even though class B's definition does not explicitly list those members: class B inherits them from class A. So the compiler will permit an object b of class B to be passed to foo even though foo's signature requires that its parameter be a reference to an object of class A.

As described so far, the inheritance mechanism does not particularly complicate the inlining process. The compiler simply copies into foo's object code the object code that results from method m1's definition in class A, and that inlined code can be used even though foo is sometimes passed references to objects of class B.

But now consider FIG. 3's definition of class C. That definition "overrides" inherited method m1. Because it is a child of class A, class C necessarily includes a member method m1, but class C gives that method a definition different from its definition for other objects of class A. So when foo is passed an object c of class C—as is legal since class C is class A's child—the call of method m1 on object o requires code different from the code required when foo is passed an object whose class is A or B. Methods permitted to be overridden are called "virtual," and virtual methods that have been overridden are called "polymorphic." Calls to such methods are called "virtual calls," which are distinguished by the fact that the location of the called method must be computed at run time. Consequently, inlining one form of a polymorphic method can yield incorrect results.

Aggressive optimizing compilers nonetheless inline polymorphic methods in some instances. They avoid incorrect results by "guarding" the inlined code with a test to determine whether the inlined form of the method is consistent with the specific class of the "receiver" object on which the method is called. If so, a virtual call is avoided.

Still, it would be better if the called method could be inlined directly, i.e., without guard code that may direct execution to a virtual call, because such guarding both exacts a cost and deprives the compiler of certain optimization opportunities. So an optimizing compiler may search the code to determine whether there is any real possibility that a form of the callee method other than the candidate for inlining would ever be called at the call site where inlining is being considered and then inline the callee if not. Unfortunately, the compiler cannot make this determination conclusively in a dynamic-compilation environment, in which a class that overrides the callee method may be loaded after the caller is compiled and execution of the resultant code has begun.

So some workers have proposed to perform the inlining tentatively, i.e., to compile the caller under the assumption that the callee has not been overridden and then recompile the caller later if a later-loaded class overrides it. This is simple enough if the caller is not being executed when the recompilation occurs: the new compilation replaces the old, and the next invocation of the caller gets the corrected code. But things are more complicated if the caller is currently being executed when the event that necessitates the recompilation occurs. In this case, such systems have to be able to change an execution state corresponding to one compilation of a method to the "equivalent" execution state for another compilation of that method. This process has been termed "on-stack replacement."

The Self language was perhaps the first programming system to implement on-stack replacement. In that language, the compiler creates structures associated with various "deoptimization points" in the compiled code for a method. These structures contain information that enable a method's "source state," i.e., the state of the method variables as defined by the source code's interpretation, to be recovered from the "machine state" of the compiled code at the associated deoptimization point. When further compilation later results in invalidating an assumption on which the compilation depends, such as the callee's not having been overridden, that compilation must occur at such a deoptimization point. The Self system then recovers the source state, recompiles the method without the violated assumption, computes the new compilation's corresponding machine state from the source state, and replaces register values and entries in the method's stack frame to make them consistent with the new machine state.

It can be readily appreciated that providing such an on-stack-replacement capability is quite complex. Moreover, the data structures required to support it can become alarmingly voluminous. Also, maintaining deoptimization points prevents a code scheduler from re-ordering code that such deoptimization points separate.

SUMMARY OF THE INVENTION

The present invention permits a significant number of virtual-call sites to be inlined directly without placing any restrictions on the caller's compilation, and it keeps the task of detecting and reacting to assumption-invalidating changes relatively simple. According to the present invention, the compiler inlines virtual calls directly only at sites where the compiler can tell at compile time that the receiver expression during any runtime execution of the calling method will necessarily refer to an object whose class was loaded when that particular execution of the caller began. If this condition is met, then a callee-overriding compilation during the caller's execution need not result in the caller's being interrupted for re-compilation, because the receiver's implementation of the callee method cannot be the overriding one in that case, and the inlined implementation must therefore be the correct one. This completely eliminates the need to replace entries in the caller's stack frame.

In one embodiment, such sites are easily found by identifying call sites at which the receiver reference is a caller argument to which the caller makes no assignment. If parameter values are passed by value, then the receiver reference is necessarily a local variable, to which only the caller can make an assignment, so the object to which the variable refers must be pre-existing if the caller does not itself make an assignment to it.

BRIEF DESCRIPTION OF THE DRAWINGS

The invention description below refers to the accompanying drawings, of which:

FIG. 3, discussed above, is a source-code listing that sets forth typical class declarations;

FIG. 4, discussed above, is a source-code listing that illustrates the use of an object that is an instance of a class declared in FIG. 3;

DETAILED DESCRIPTION OF AN ILLUSTRATIVE EMBODIMENT

Figure 1:
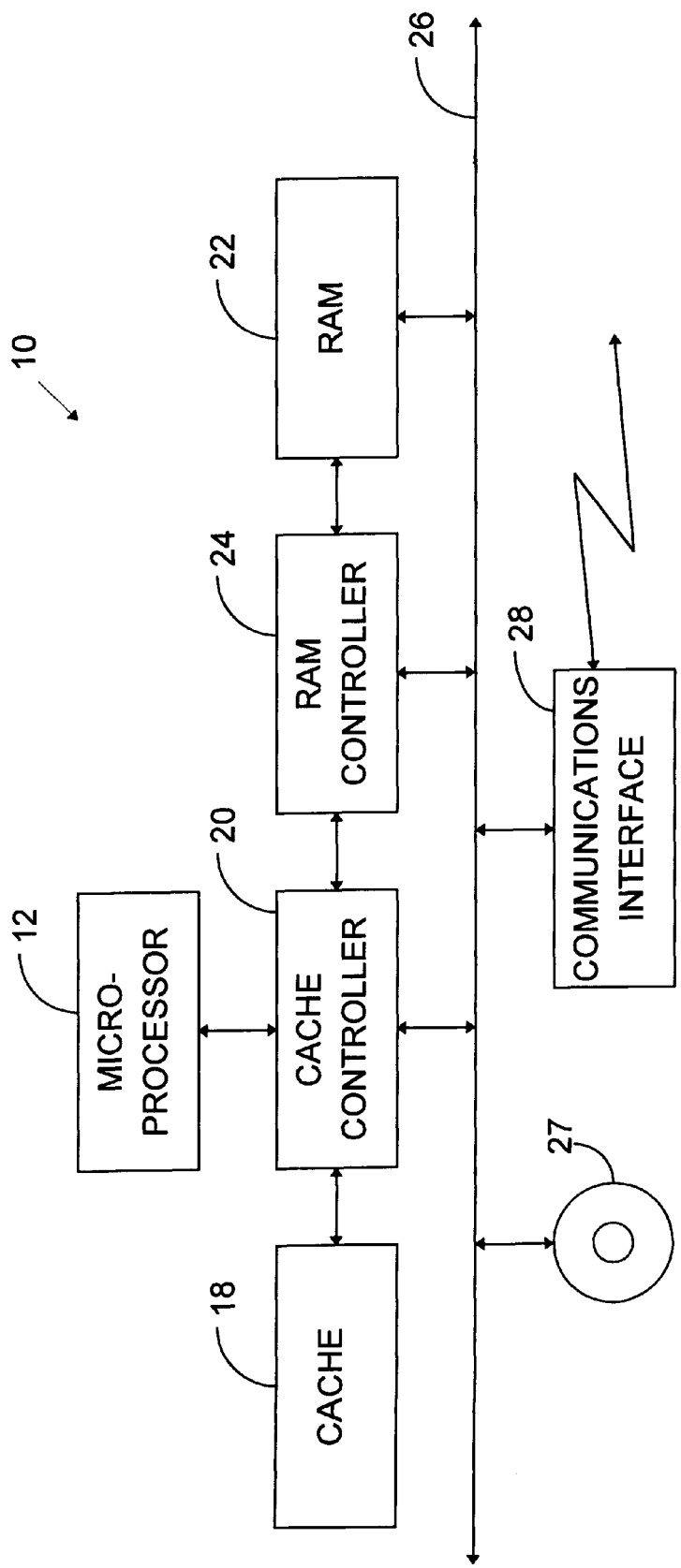
FIG. 1, discussed above, is a block diagram of a typical computer system of the type that can be configured to compile a source program.

In a typical dynamic-compilation environment in which the present invention's teachings may be practiced, not all of the compilation is completed before execution of some of the resultant object code begins. For example, the compilation process may be "lazy" in the sense that it compiles only, say, a main procedure without initially compiling any of the procedures that the main procedure can call. In place of the calls to those procedures, for instance, it may provide stubs that determine whether the callee procedure's source code should be compiled or interpreted. So a callee procedure is not compiled unless the object code's execution reaches such a stub.

Now consider the resultant compilation in such an environment. The compilation proceeds in the normal fashion, with source-code instructions being converted into machine-code instructions, until a point is reached where the source code represents a procedure call. The ordinary result is simply object code for implementing the procedure call, i.e. for saving the caller process's context and passing any arguments and control to the caller. But methods that meet certain criteria are good candidates to be inlined instead, so the compiler identifies such candidates in accordance with a decision process such as that which FIG. 5's simplified flow chart depicts.

Decision block 40 represents a basic inlining criterion, namely, size. If the callee method is long, it is not a good inlining candidate. In most cases, the compiler will also eliminate from consideration any polymorphic method, e.g., a virtual method called on a variable whose static type has a descendant that overrides that method so that the particular form of the method that will be executed is unknowable until run time. Although such elimination is not an absolute requirement of the present invention's broader teachings, it will be a feature of most implementations, so FIG. 5 includes block 44 to represent such a criterion.

Although not essential, the criteria of blocks 40 and 44 are typical, and most implementations will additionally impose other threshold criteria, as block 46 indicates. Block 48 indicates that the compiler additionally imposes the requirement that the method's receiver expression meet what will be called a pre-existence criterion. As will become apparent, imposing that criterion makes it more practical in a dynamic-compilation environment to inline virtual calls directly.

That criterion's purpose can be understood by considering a calling procedure m1 that contains a method invocation o.m2( ) at some given call site, where variable o is declared to contain a reference to an object of class O. We assume that at the time of the caller procedure m1's compilation no descendant of class O that overrides class O's method m2 has been loaded and that the site meets other threshold criteria as well. In a dynamic-compilation environment, though, this criterion may later be violated, since loading and compiling proceed concurrently with the resulting code's execution. To detect such changes and respond to them, steps would have to be taken in the absence of the present invention's teachings that could compromise direct inlining's attractiveness.

The present invention keeps the task of detecting and reacting to such changes relatively simple but permits a significant number of virtual-call sites to be inlined directly. According to the present invention, the compiler inlines virtual calls directly only at sites where the compiler can tell at compile time that the receiver expression during any run-time execution of the calling method will necessarily refer to an object whose class was loaded when that particular execution of the caller began. If this criterion is met, then the object code for the calling method m1 will need no special provisions to ensure that the assumptions on which virtual call o.m2( )'s inlining was based remain valid. As will be explained presently, all that is needed is to check the assumptions—and recompile the caller procedure if necessary—before allocating the first object of any newly loaded class. It will also be shown below that the resultant recompiling need never interrupt any execution of caller code in which the callee was inlined under assumptions whose violation necessitated the recompilation.

Figures 2, 6, 8:
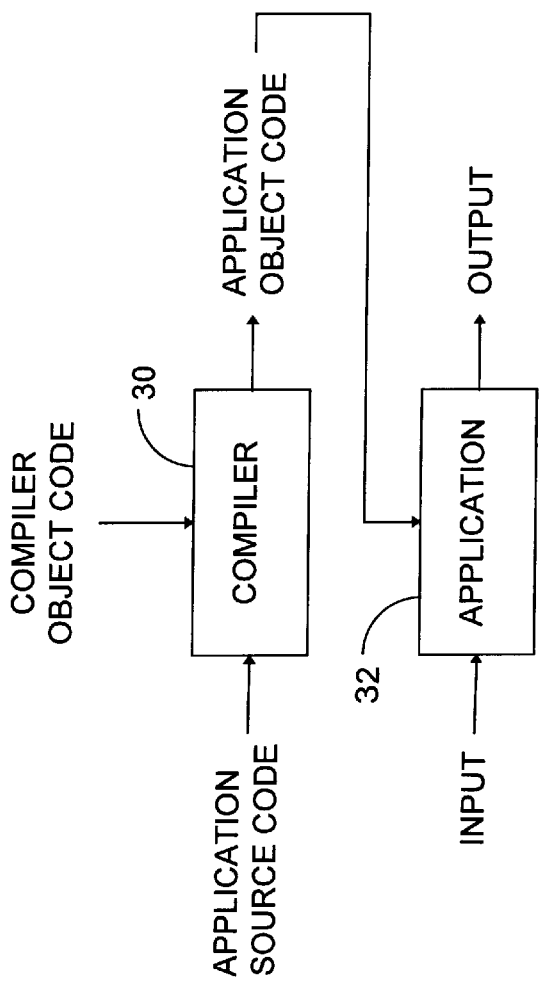
FIG. 2, discussed above, is a block diagram of the progression from source code to application execution.
FIG. 6 is a source-code fragment illustrating various call sites that may be candidates for inlining.
FIG. 8 is a code fragment that depict the class definition of a class having an immutable member.

Note, first, that any allocated object necessarily has a class that is loaded. So proving that an object is allocated on entry to a method suffices to show that it meets the criterion, that is, that its class was loaded on entry to the method. It turns out that many sites meeting this "allocatedness" criterion can be identified quite easily. FIG. 6 employs a code fragment in the Java programming language that illustrates a simple technique for doing so, which will be called here an invariant-argument analysis. Consider the receiver object to which object variable o refers in the method call o.m2( ). Inspection of the caller method m1 reveals that its body contains no assignment to object variable o within the caller method. Now, the absence of an assignment to a variable within a procedure does not alone mean that the object to which the variable refers must already have been allocated when the procedure was entered; a different execution thread or another procedure called by the calling procedure could assign a non-local variable a reference to a newly allocated object. But receiver-object variable o, having been passed its value when caller method m1 was called, is a local variable, so the object to which it refers must necessarily have been allocated before the calling procedure's entry if the caller method does not itself assign a value to it. This means that execution of the caller need never be interrupted for recompilation—and replacement of the values associated with it on the call stack—even if an overriding method is compiled concurrently with the caller's execution and thus invalidates the assumption on which the inlining was based.

So a call site passes the invariant-argument analysis if its receiver expression is a caller argument whose value is passed on entry into the caller and the caller does not thereafter assign a new value to it. Since all procedure parameters are passed by value in the Java programming language, receivers that meet this criterion are readily recognized. In some other languages, in which parameters can be passed by reference, care must be taken not to consider by-reference parameters as invariant arguments and to recognize as possible assignments instances in which the caller passes the receiver to a callee by reference.

Figure 5:
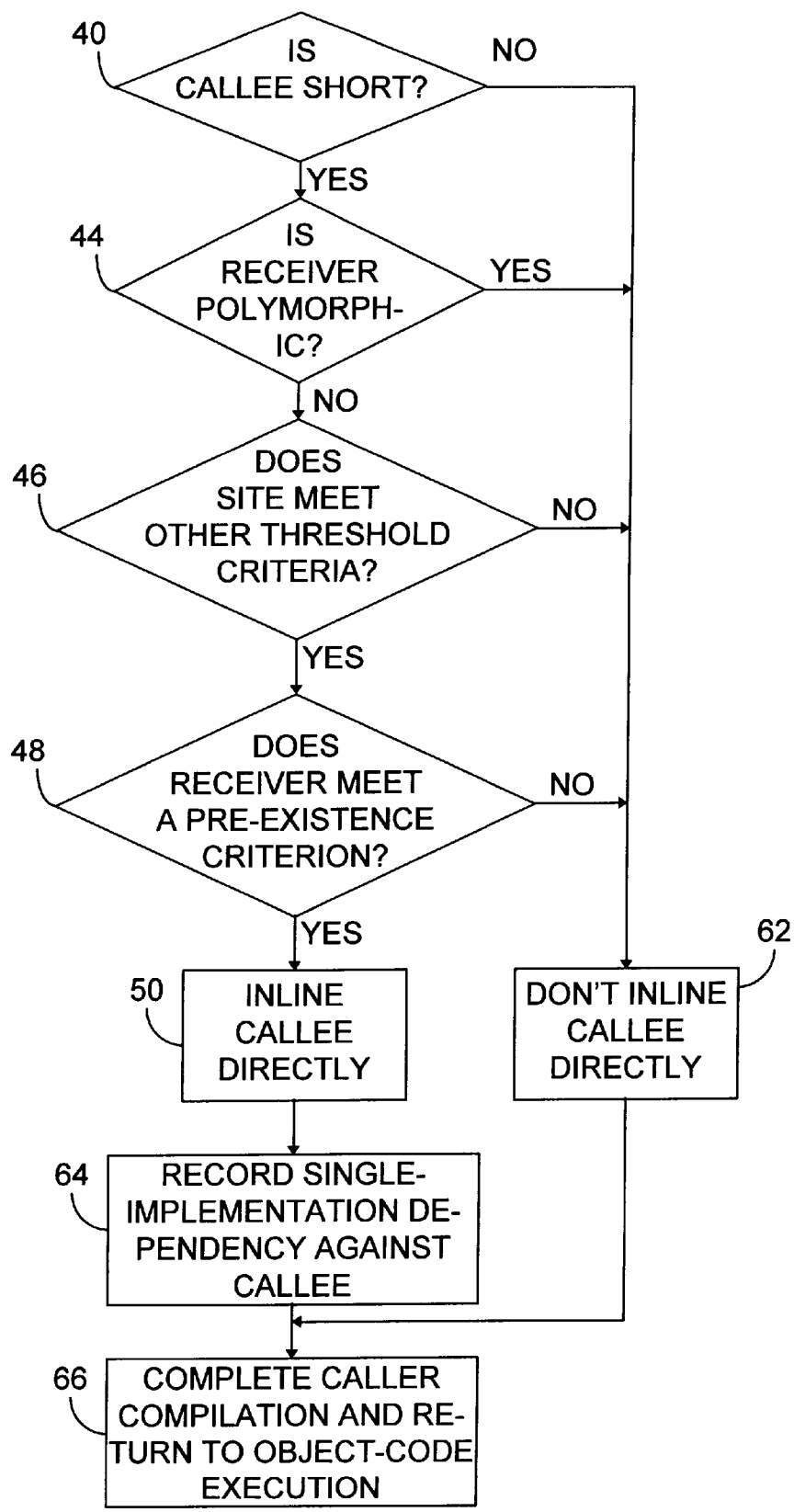
FIG. 5 is a flow chart of the decision process employed by the invention's illustrated embodiment to determine whether to inline a virtual call directly.
Figure 7:
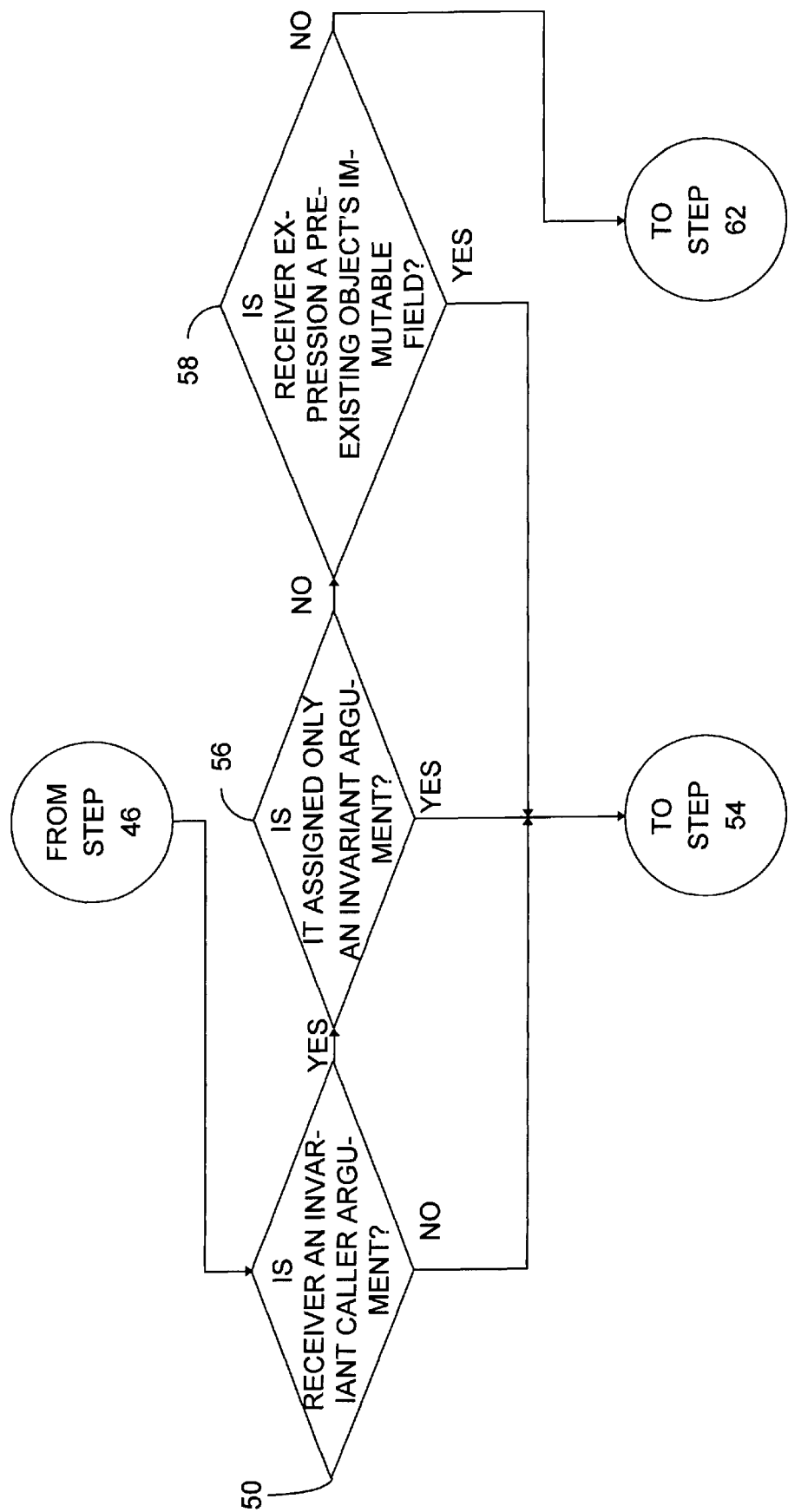
FIG. 7 is a flow chart depicting imposition of various versions of the present invention's pre-existence criterion.

FIG. 7 depicts FIG. 5's step 48 in more detail and shows that there may also be alternative pre-existence criteria. Block 50 represents the just-explained test of identifying sites where the receiver variable is an invariant argument. As FIG. 5's step 54 shows, that test results in direct inlining if the caller never assigns a value to the receiver variable. Even if the caller does make such an assignment, though, direct inlining may still be appropriate, and some of the invention's embodiments may accordingly include a test such as that which FIG. 7's block 56 represents. FIG. 6's sites containing the calls o2.m2( ) and o3.m2( ) are examples of sites that pass this test.

In the case of o2.m2( ), the preceding statement "O o2=o" shows that the caller assigns a value to the variable o2 containing the receiver-object reference, but the value thereby assigned is that of an invariant argument. The pre-existence of the object to which a local variable refers can be inferred from its being assigned only the value of another such variable. So o2.m2 must be the same implementation as o.m2. Note that a local variable can meet this criterion recursively: a local variable assigned only o2's value would also pass the test.

In the case of call o3.m2( ), the preceding statement "O o3=o.clone( )" makes an assignment to the variable o3 containing the receiver reference. The value is not the same as variable o's, but it is a reference to an object that necessarily has the same dynamic type as the invariant argument o. Implementation o3.m2 must therefore be the same as implementation o.m2 and thus the same as the inlined implementation. Again, therefore, the call site involved meets the present invention's pre-existence criterion, and the callee at that site can be inlined.

The FIG. 6 site containing the call o.f.m3( ) may meet another alternative preexistence test, which will be referred to as the immutable-field test. A call site passes this test if the receiver expression refers to a preexisting object's member that is "immutable" in the sense that it can be assigned only by the constructor method of that object's class. For example, suppose that class O defines its member f in the manner that FIG. 8 illustrates, namely, as a "private" member to which no member method other than the class constructor assigns a value. Since the Java programming language's "private" keyword indicates that access to a member whose declaration is so modified is limited to members of the same class, member f is assigned a value only upon the construction of the object of which it is a member, namely, the object to which variable o refers. The value to be assigned to member o.f is passed to object o's constructor as an argument. So the member object to which variable f refers must necessarily have been allocated before that constuctor's invocation. But if the object that variable o references is pre-existing and before that object's construction the one to which o.f refers was allocated, then the object to which o.f refers must also be pre-existing. The same would be true if member f had been declared "final" instead of "private," since that keyword imposes the constraint that the value of a variable so modified cannot be changed after it is initially assigned. In both cases, the call site at which the receiver expression is o.f meets a pre-existence criterion.

In any of the inlining cases just mentioned, there is no need to include in the calling procedure's object code any provisions for revising the inlined part when the assumptions on which the inlining was based are violated. Such provisions can instead conveniently be implemented entirely in the compilation operations that cause the assumptions' violation, as will now be explained by reference to FIG. 9.

The object code resulting from compilation of the caller procedure m1 is placed in a compiled-code block 70, in which it is possibly preceded by a header part 72 containing housekeeping information. In a dynamic-compilation environment, the compiled code may be tentative: its continued validity can depend on what code is subsequently loaded. In particular, if the procedure has directly inlined virtual method m2 in accordance with the criteria described above, the continued validity of the object code in block 70 depends on whether the number of the callee method m2's implementations is the same as it was when the caller procedure m1 was compiled. In the illustrated embodiment, which directly inlines only "monomorphic" methods, the inlined code's validity depends on the assumption that there is only one such implementation.

Figure 9:
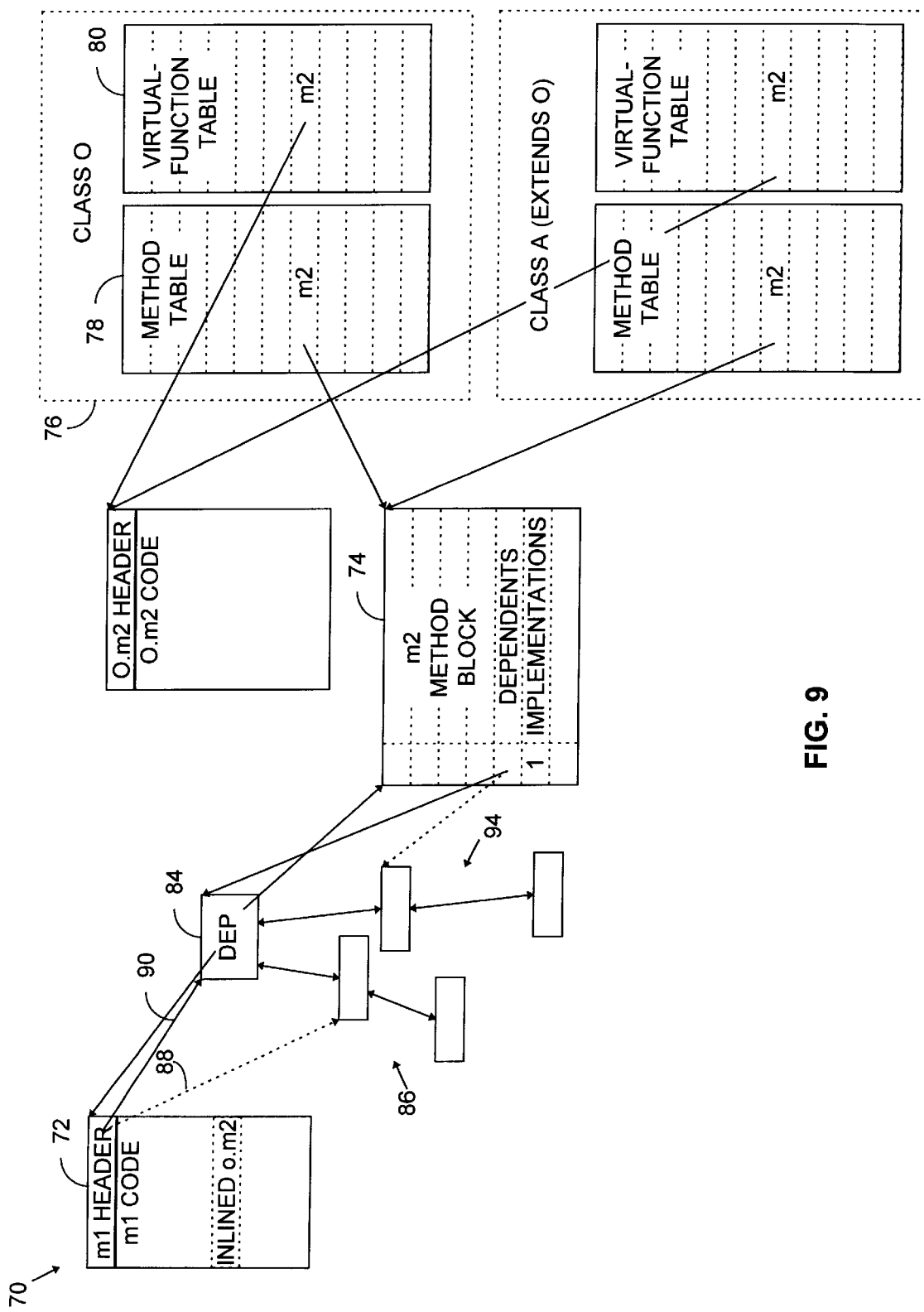
FIG. 9 is a diagram of various data structures that the illustrated embodiment employs to determine when to recompile calling procedures that have been compiled under the assumptions that certain of their callees have not been overridden.
Figure 10:
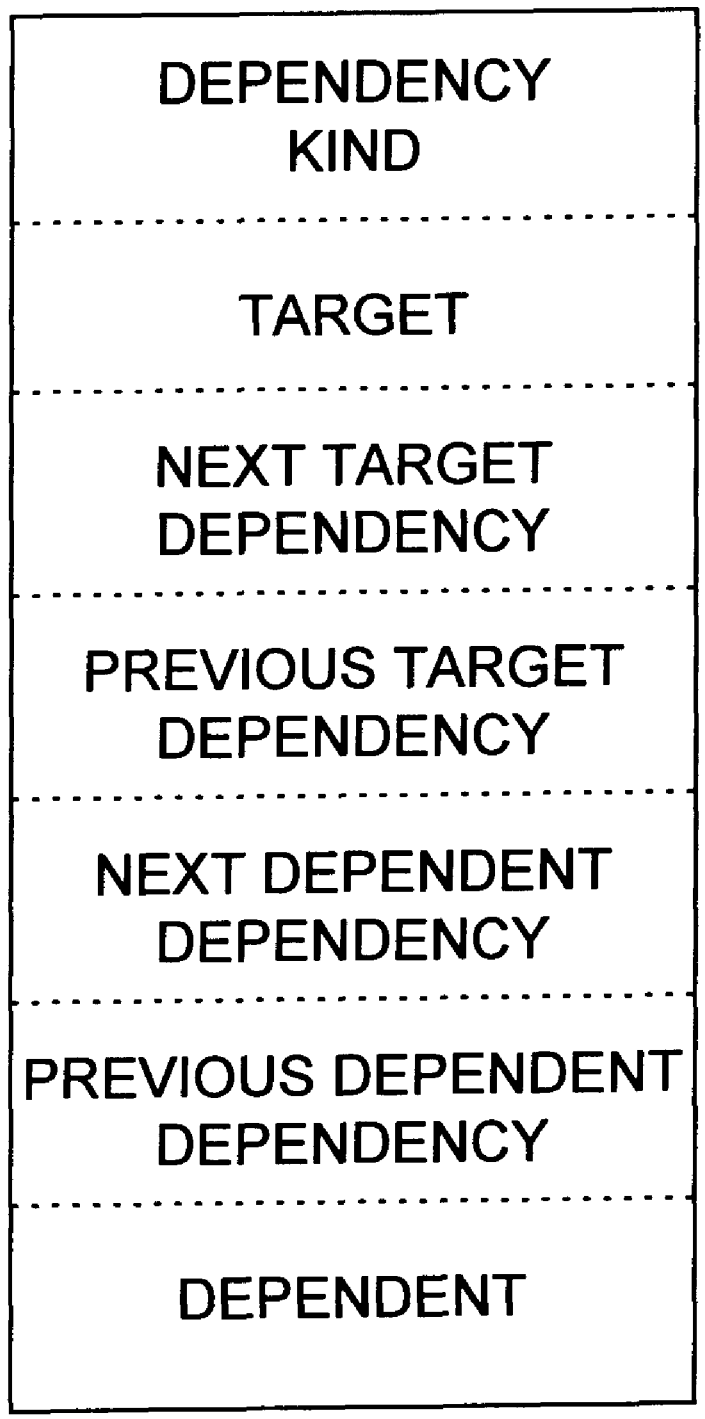
FIG. 10 is a more-detailed diagram of a dependency structure that FIG. 9 includes.
Figure 11:
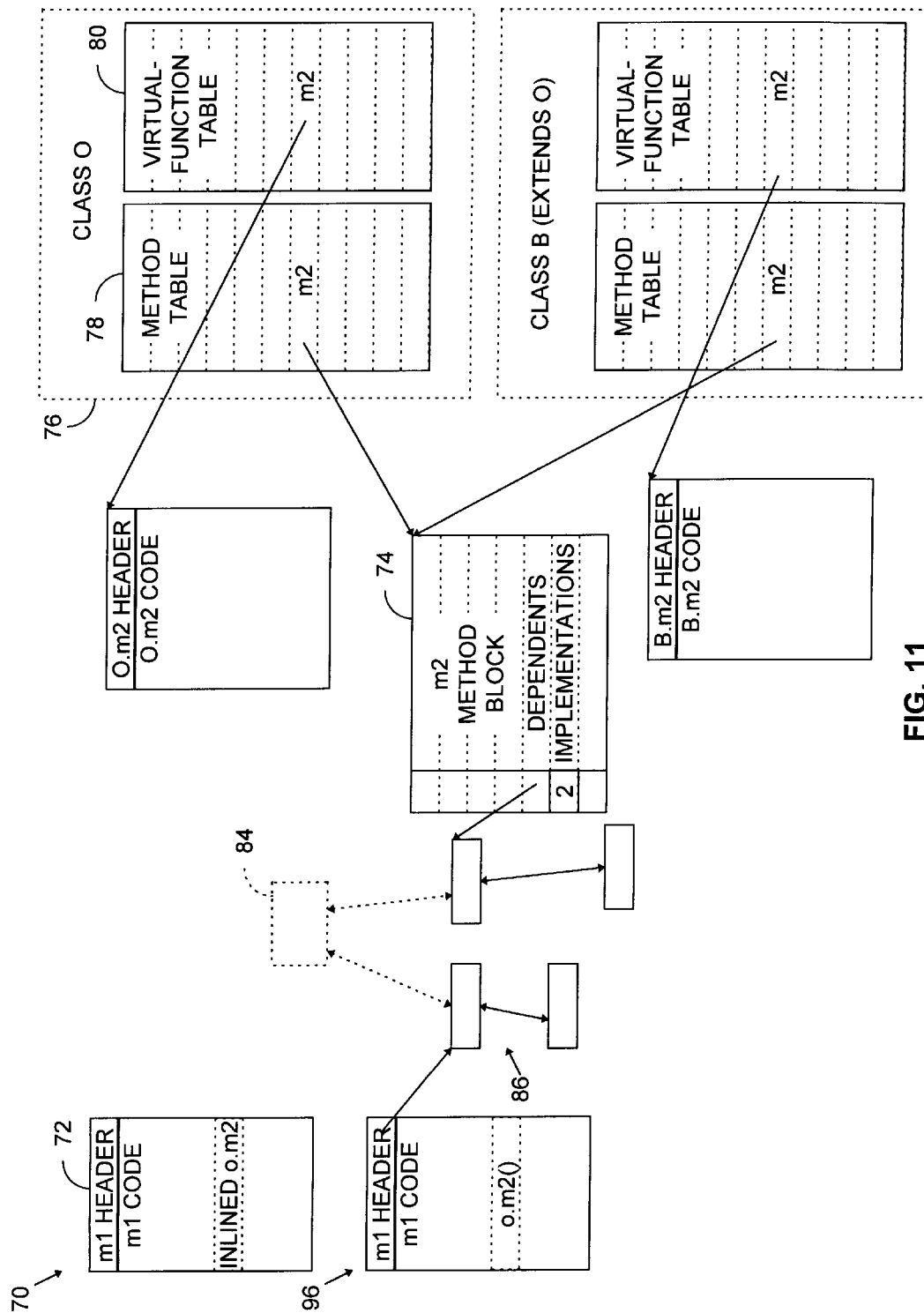
FIG. 11 is a diagram similar to FIG. 9 illustrating the result of loading a class that overrides a directly inlined callee method.

To provide a mechanism for reacting when that assumption is violated, the compilation operation creates a "dependency structure," of which FIG. 10 depicts a typical format. An object-code block's continued validity may depend on various types of assumptions that a dependency structure could document, so the structure's first field specifies the single-implementation type of dependency, which means in this case that procedure m1's validity depends on the assumption that callee method m2 has not been overridden. The structure's next, "target" field identifies the callee assumed to be only singly implemented, while its last, "dependent" field identifies the calling procedure whose validity depends on that assumption. In the illustrated embodiment, these identifications take the form of pointers to the "method block" 74 (FIG. 9) associated with the callee procedure m2 and to the compiled-code container 70 associated with the caller procedure m1. The compiler uses a method block to store various information common to all of its associated method's implementations.

For the sake of example, FIG. 9 depicts method m2's method block 74 as being separate from the callee method's compiled-code container as well as from a class file 76 that contains various information about class O, the static type of method m2's receiver expression at the call site of interest. The class file typically contains many kinds of class-related information that the drawing does not represent, such as it member methods' source code in the form of Java Virtual Machine byte code. Also for the sake of example, the class file is depicted as having been provided upon loading with separate method and virtual-function tables 78 and 80, which respectively point to the method blocks and compiled-code containers for class O's various member methods.

The remaining fields that FIG. 10 depicts support the illustrated embodiment's implementation of the dependency structure as an element of two doubly linked lists. When the dependency structure 84 is created to document caller m1's dependency on callee m2's being only singly implemented, it is placed in a linked list 86 of structures that represent other dependencies. Specifically, if any dependency structures have been created to document other assumptions on which the caller object code's validity is based, a pointer in the header of caller m1's compiled-code container specifies the location of the first in a linked list of such structures, as arrow 88 indicates, and the new dependency structure is added to the head of the list by its "next dependent dependency" field's being filled with the location of the erstwhile first structure, its "previous dependent dependency" field's being filled with the new structure's location, and its list-head pointer's being redirected as arrow 90 indicates.

The new structure having been installed in a list of structures that document assumptions on which the caller object code's validity is based, it is also installed in a list 94 of structures that document dependencies on one or another of the callee's features. Specifically, it finds in the "dependents" field of callee method m2's method block a pointer to the structure at the head of that list, installs the new structure by making appropriate entries in those structures' "next target dependency" and "previous target dependency" fields, and redirecting the list-head pointer.

If a subsequently loaded class A is a descendant of the class O in which the directly inlined callee method m2 is defined, that descendant will by definition inherit any of class O's non-private methods, so its method table will receive an entry that points to that method's common-feature method block 74, and that block will be updated. If class A does not override method m2, though, there will be no change in method block 74's "implementations" field, which indicates how many different m2 implementations have been compiled. So long as that field indicates that method m2 has only one implementation, the object-code program can continue to enjoy the benefits of that method's direct inlining.

But now consider what happens if the methods being compiled are instead those of a descendant class B that overrides m2. The result is a different implementation of that method, as FIG. 1's compiled-code container 96 indicates. So the implementations field of method m2's method block 74 is updated to indicate that there are now two dependencies, and the dependency list to which the "dependents" field of method m2's method block points is searched for single-implementation dependencies.

That search identifies dependency structure 84, which indicates that procedure m1's compilation was based on method m2's being singly implemented. Procedure m1 is accordingly recompiled without the direct inlining, as FIG. 1's block indicates by the inclusion of a virtual call in a new compiled-code container for method m2. All references to method m1, such as the associated entries in the virtual table of its class and any ancestor class, are updated so that any code that calls procedure m1 will be directed to the new compiled-code container 96 rather than the previous code container 70, whose code is no longer valid. Since the new code's validity does not depend on the assumption that O.m2 has not been overridden, dependency structure 84 is removed from both lists. Class B's compilation can now be completed, and any procedure that was waiting to instantiate that class can do so.

To appreciate the simplicity that this invention affords, consider the situation in which one execution thread is in the midst of executing callee procedure m1 when class B is compiled. In such a case, a second implementation of method m2 has come into existence during the execution of a procedure that was compiled under the assumption that method m2 has only one implementation. If direct inlining had been performed at sites that did not meet the present invention's criteria, then procedure m1 might have had to guard the inlining with code for checking the number of m2 implementations, and entries in method m1's stack frame would have to be replaced. But no such on-stack replacement is necessary when the present invention's criteria are observed, because no instance of class B could have been allocated before entry into procedure m1 as compiled with the direct inlining, and method m2 cannot be called at the inlining site on an object that was not yet allocated when that execution of procedure m1 began.

So the present invention greatly simplifies inlining in dynamic compiling environments and thus constitutes a significant advance in the art.

What is claimed is:

1. A computer system configured by machine-readable instructions to:

A) read electrical signals representing a source-code calling procedure that includes at least one call site at which the calling procedure calls a virtual method on an object referred to by a receiver expression that refers to an object;

B) compile the source-code calling procedure into an object-code calling procedure by:

i) determining, for each call site that meets threshold criteria for direct inlining, whether that call site meets any of at least one preexistence criterion from which it can be inferred during the calling procedure's compilation that the class of the object to which the receiver refers during any given execution of the calling procedure will have been loaded by the time the given execution commences; and ii) for each call site thereby determined to meet a pre-existence criterion, placing into the object-code calling procedure directly inlined code for each currently loaded form of the virtual method called by the source-code calling procedure thereat; and C) store the object-code calling procedure in a machine-readable storage medium.

2. A computer system as defined in claim 1 wherein the machine-readable instructions configure the computer system to:
   A) record, against each virtual method inlined in the object-code calling procedure as a result of its call site's meeting at least one said pre-existence criterion, the object-code calling procedure's dependence on the current number of implementations of that virtual method;
   B) thereafter read electrical signals representing a new source-code form of a virtual method after the object-code calling procedure has been stored in the machine-readable storage medium;
   C) compile the new source-code form into a new object-code form;
   D) determine whether the new form overrides a virtual method against which the calling procedure's dependence on a given number of implementations has been recorded; and
   E) if the new form does override such a virtual method:
      i) recompile the source-code calling procedure into a replacement object-code calling procedure; and
      ii) store the replacement object-code calling procedure in a machine-readable storage medium before permitting any of the compiled object code to be executed after the new source-code form has been compiled.

3. A computer system as defined in claim 2 wherein one said threshold criterion for direct inlining at a call site is that only one form of the virtual method called at the call site has been loaded.

4. A computer system as defined in claim 1 wherein one said pre-existence criterion is that the receiver expression is a calling-procedure local variable to which the calling procedure does not assign a value.

5. A computer system as defined in claim 1 wherein one said pre-existence criterion is that the receiver expression is an invariant local variable, where an invariant local variable is defined as a local variable to which the calling procedure does not assign a value other than that of another invariant local variable.

6. A computer system as defined in claim 1 wherein one said pre-existence criterion for a call site is that the receiver expression refers to an immutable member of an object that meets a criterion from which it can be inferred during the calling procedure's compilation that the object to which receiver refers during any given execution of the calling procedure will have been constructed by the time the given execution commences.

7. A computer system as defined in claim 1 wherein one said pre-existence criterion for a call site is that the receiver expression refers to an immutable member either of another immutable member or of an object that is referred to by an invariant local variable, where an immutable member is one that can be assigned only in a constructor, and an ins variant local variable is defined as a local variable to which the calling procedure does not assign a value other than that of another invariant local variable.

8. A computer system configured by machine-readable instructions to:
   A) read electrical signals representing a source-code calling procedure that calls a target virtual method;
   B) compile the source-code calling procedure into an object-code calling procedure by placing directly inlined code for each currently loaded form of the target virtual method into the object-code calling procedure;
   C) record against the calling procedure and the target method the calling procedure's dependence on the current number of implementations of the target virtual method;
   D) store the object-code calling procedure in a machine-readable storage medium;
   E) thereafter read electrical signals representing a new form of a virtual method;
   F) determine whether the new form overrides a virtual method against which the calling procedure's dependence on a given number of implementations has been recorded;
   G) if so, recompile the source-code calling procedure into a replacement object-code calling procedure; and
   H) store the replacement object-code calling procedure in a machine-readable storage medium.

9. A computer system including:
   A) means for reading electrical signals representing a source-code calling procedure that includes at least one call site at which the calling procedure calls a virtual method on an object referred to by a receiver expression that refers to an object;
   B) means for compiling the source-code calling procedure into an object-code calling procedure by:
      i) determining, for each call site that meets threshold criteria for direct inlining, whether that call site meets any of at least one preexistence criterion from which it can be inferred during the calling procedure's compilation that the class of the object to which the receiver refers during any given execution of the calling procedure will have been loaded by the time the given execution commences; and
      ii) for each call site thereby determined to meet a pre-existence criterion, placing into the object-code calling procedure directly inlined code for each currently loaded form of the virtual method called by the source-code calling procedure thereat; and
   C) means for storing the object-code calling procedure in a machine-readable storage medium.

10. A computer system as defined in claim 9 further including:
   A) means for recording, against each virtual method inlined in the object-code calling procedure as a result of its call site's meeting at least one said preexistence criterion, the object-code calling procedure's dependence on the current number of implementations of that virtual method;
   B) means for thereafter reading electrical signals representing a new source-code form of a virtual method after the object-code calling procedure has been stored in the machine-readable storage medium;
   C) means for compiling the new source-code form into a new object-code form;
   D) means for determining whether the new form overrides a virtual method against which the calling procedure's dependence on a given number of implementations has been recorded; and
   E) means for, if the new form does override such a virtual method:
      i) recompiling the source-code calling procedure into a replacement object-code calling procedure; and
      ii) storing the replacement object-code calling procedure in a machine-readable storage medium before permitting any of the compiled object code to be executed after the new source-code form has been compiled.

11. A computer system as defined in claim 10 wherein one said threshold criterion for direct inlining at a call site is that only one form of the virtual method called at the call site has been loaded.

12. A computer system as defined in claim 9 wherein one said pre-existence criterion is that the receiver expression is a calling-procedure local variable to which the calling procedure does not assign a value.

13. A computer system as defined in claim 9 wherein one said pre-existence criterion is that the receiver expression is an invariant local variable, where an invariant local variable is defined as a local variable to which the calling procedure does not assign a value other than that of another invariant local variable.

14. A computer system as defined in claim 9 wherein one said pre-existence criterion for a call site is that the receiver expression refers to an immutable member of an object that meets a criterion from which it can be inferred during the calling procedure's compilation that the object to which receiver refers during any given execution of the calling procedure will have been constructed by the time the given execution commences.

15. A computer system as defined in claim 9 wherein one said pre-existence criterion for a call site is that the receiver expression refers to an immutable member either of another immutable member or of an object that is referred to by an invariant local variable, where an immutable member is one that can be assigned only in a constructor, and an invariant local variable is defined as a local variable to which the calling procedure does not assign a value other than that of another invariant local variable.

16. A computer system comprising:
    A) means for reading electrical signals representing a source-code calling procedure that calls a target virtual method;
    B) means for compiling the source-code calling procedure into an object-code calling procedure by placing directly inlined code for each currently loaded form of the target virtual method into the object-code calling procedure;
    C) means for recording against the calling procedure and the target method the calling procedure's dependence on the current number of implementations of the target virtual method;
    D) means for storing the object-code calling procedure in a machine-readable storage medium;
    E) means for thereafter reading electrical signals representing a new form of a virtual method;
    F) means for determining whether the new form overrides a virtual method against which the calling procedure's dependence on a given number of implementations has been recorded;
    G) means for, if so, recompiling the source-code calling procedure into a replacement object-code calling procedure; and
    H) means for storing the replacement object-code calling procedure in a machine-readable storage medium.

17. A method of generating object code comprising:
    A) reading electrical signals representing a source-code calling procedure that includes at least one call site at which the calling procedure calls a virtual method on an object referred to by a receiver expression that refers to an object;
    B) compiling the source-code calling procedure into an object-code calling procedure by:
        i) determining, for each call site that meets threshold criteria for direct inlining, whether that call site meets any of at least one preexistence criterion from which it can be inferred during the calling procedure's compilation that the class of the object to which the receiver refers during any given execution of the calling procedure will have been loaded by the time the given execution commences; and
        ii) for each call site thereby determined to meet a pre-existence criterion, placing into the object-code calling procedure directly inlined code for each currently loaded form of the virtual method called by the source-code calling procedure thereat; and
    C) storing the object-code calling procedure in a machine-readable storage medium.

18. A method as defined in claim 17 further including:
    A) recording, against each virtual method inlined in the object-code calling procedure as a result of its call site's meeting at least one said preexistence criterion, the object-code calling procedure's dependence on the current number of implementations of that virtual method;
    B) thereafter reading electrical signals representing a new source-code form of a virtual method after the object-code calling procedure has been stored in the machine-readable storage medium;
    C) compiling the new source-code form into a new object-code form;
    D) determining whether the new form overrides a virtual method against which the calling procedure's dependence on a given number of implementations has been recorded; and
    E) if the new form does override such a virtual method:
        i) recompiling the source-code calling procedure into a replacement object-code calling procedure; and
        ii) storing the replacement object-code calling procedure in a machine-readable storage medium before permitting any of the compiled object code to be executed after the new source-code form has been compiled.

19. A method as defined in claim 18 wherein one said threshold criterion for direct inlining at a call site is that only one form of the virtual method called at the call site has been loaded.

20. A method as defined in claim 17 wherein one said pre-existence criterion is that the receiver expression is a calling-procedure local variable to which the calling procedure does not assign a value.

21. A method as defined in claim 17 wherein one said pre-existence criterion is that the receiver expression is an invariant local variable, where an invariant local variable is defined as a local variable to which the calling procedure does not assign a value other than that of another invariant local variable.

22. A method as defined in claim 17 wherein one said pre-existence criterion for a call site is that the receiver expression refers to an immutable member of an object that meets a criterion from which it can be inferred during the calling procedure's compilation that the object to which receiver refers during any given execution of the calling procedure will have been constructed by the time the given execution commences.

23. A method as defined in claim 17 wherein one said pre-existence criterion for a call site is that the receiver expression refers to an immutable member either of another immutable member or of an object that is referred to by an invariant local variable, where an immutable member is one that can be assigned only in a constructor, and an invariant local variable is defined as a local variable to which the calling procedure does not assign a value other than that of another invariant local variable.

24. A method of compiling object code comprising:
   A) reading electrical signals representing a source-code calling procedure that calls a target virtual method;
   B) compiling the source-code calling procedure into an object-code calling procedure by placing directly inlined code for each currently loaded form of the target virtual method into the object-code calling procedure;
   C) recording against the calling procedure and the target method the calling procedure's dependence on the current number of implementations of the target virtual method;
   D) storing the object-code calling procedure in a machine-readable storage medium;
   E) thereafter reading electrical signals representing a new form of a virtual method;
   F) determining whether the new form overrides a virtual method against which the calling procedure's dependence on a given number of implementations has been recorded;
   G) if so, recompiling the source-code calling procedure into a replacement object-code calling procedure; and
   H) storing the replacement object-code calling procedure in a machine-readable storage medium.

25. A computer data signal embodied in a carrier wave and representing a sequence of instructions that, when executed by a computer system, configures the computer system to:
   A) read electrical signals representing a source-code calling procedure that includes at least one call site at which the calling procedure calls a virtual method on an object referred to by a receiver expression that refers to an object;
   B) compile the source-code calling procedure into an object-code calling procedure by:
      i) determining, for each call site that meets threshold criteria for direct inlining, whether that call site meets any of at least one preexistence criterion from which it can be inferred during the calling procedure's compilation that the class of the object to which the receiver refers during any given execution of the calling procedure will have been loaded by the time the given execution commences; and
      ii) for each call site thereby determined to meet a pre-existence criterion, placing into the object-code calling procedure directly inlined code for each currently loaded form of the virtual method called by the source-code calling procedure thereat; and
   C) store the object-code calling procedure in a machine-readable storage medium.

26. A computer data signal as defined in claim 25 wherein the machine-readable instructions configure the computer system to:
   A) record, against each virtual method inlined in the object-code calling procedure as a result of its call site's meeting at least one said pre-existence criterion, the object-code calling procedure's dependence on the current number of implementations of that virtual method;
   B) thereafter read electrical signals representing a new source-code form of a virtual method after the object-code calling procedure has been stored in the machine-readable storage medium;
   C) compile the new source-code form into a new object-code form;
   D) determine whether the new form overrides a virtual method against which the calling procedure's dependence on a given number of implementations has been recorded; and
   E) if the new form does override such a virtual method:
      i) recompile the source-code calling procedure into a replacement object-code calling procedure; and
      ii) store the replacement object-code calling procedure in a machine-readable storage medium before permitting any of the compiled object code to be executed after the new source-code form has been compiled.

27. A computer data signal as defined in claim 26 wherein one said threshold criterion for direct inlining at a call site is that only one form of the virtual method called at the call site has been loaded.

28. A computer data signal as defined in claim 25 wherein one said pre-existence criterion is that the receiver expression is a calling-procedure local variable to which the calling procedure does not assign a value.

29. A computer data signal as defined in claim 25 wherein one said pre-existence criterion is that the receiver expression is an invariant local variable, where an invariant local variable is defined as a local variable to which the calling procedure does not assign a value other than that of another invariant local variable.

30. A computer data signal as defined in claim 25 wherein one said pre-existence criterion for a call site is that the receiver expression refers to an immutable member of an object that meets a criterion from which it can be inferred during the calling procedure's compilation that the object to which receiver refers during any given execution of the calling procedure will have been constructed by the time the given execution commences.

31. A computer data signal as defined in claim 25 wherein one said pre-existence criterion for a call site is that the receiver expression refers to an immutable member either of another immutable member or of an object that is referred to by an invariant local variable, where an immutable member is one that can be assigned only in a constructor, and an invariant local variable is defined as a local variable to which the calling procedure does not assign a value other than that of another invariant local variable.

32. A computer data signal embodied in a carrier wave and representing a sequence of instructions that, when executed by a computer system, configures the computer system to:
   A) read electrical signals representing a source-code calling procedure that calls a target virtual method;
   B) compile the source-code calling procedure into an object-code calling procedure by placing directly inlined code for each currently loaded form of the target virtual method into the object-code calling procedure;
   C) record against the calling procedure and the target method the calling procedure's dependence on the current number of implementations of the target virtual method;
   D) store the object-code calling procedure in a machine-readable storage medium;
   E) thereafter read electrical signals representing a new form of a virtual method;

F) determine whether the new form overrides a virtual method against which the calling procedure's dependence on a given number of implementations has been recorded;

G) if so, recompile the source-code calling procedure into a replacement object-code calling procedure; and H) store the replacement object-code calling procedure in a machine-readable storage medium.

33. A storage medium containing instructions readable by a computer system to configure the computer system to:

A) read electrical signals representing a source-code calling procedure that includes at least one call site at which the calling procedure calls a virtual method on an object referred to by a receiver expression that refers to an object;

B) compile the source-code calling procedure into an object-code calling procedure by:
  i) determining, for each call site that meets threshold criteria for direct inlining, whether that call site meets any of at least one pre-existence criterion from which it can be inferred during the calling procedure's compilation that the class of the object to which the receiver refers during any given execution of the calling procedure will have been loaded by the time the given execution commences; and
  ii) for each call site thereby determined to meet a pre-existence criterion, placing into the object-code calling procedure directly inlined code for each currently loaded form of the virtual method called by the source-code calling procedure thereat; and C) store the object-code calling procedure in a machine-readable storage medium.

34. A storage medium as defined in claim 33 wherein the machine-readable instructions configure the computer system to:

A) record, against each virtual method inlined in the object-code calling procedure as a result of its call site's meeting at least one said pre-existence criterion, the object-code calling procedure's dependence on the current number of implementations of that virtual method;

B) thereafter read electrical signals representing a new source-code form of a virtual method after the object-code calling procedure has been stored in the machine-readable storage medium;

C) compile the new source-code form into a new object-code form;

D) determine whether the new form overrides a virtual method against which the calling procedure's dependence on a given number of implementations has been recorded; and E) if the new form does override such a virtual method:
  i) recompile the source-code calling procedure into a replacement object-code calling procedure; and
  ii) store the replacement object-code calling procedure in a machine-readable storage medium before permitting any of the compiled object code to be executed after the new source-code form has been compiled.

35. A storage medium as defined in claim 34 wherein one said threshold criterion for direct inlining at a call site is that only one form of the virtual method called at the call site has been loaded.

36. A storage medium as defined in claim 33 wherein one said pre-existence criterion is that the receiver expression is a calling-procedure local variable to which the calling procedure does not assign a value.

37. A storage medium as defined in claim 33 wherein one said pre-existence criterion is that the receiver expression is an invariant local variable, where an invariant local variable is defined as a local variable to which the calling procedure does not assign a value other than that of another invariant local variable.

38. A storage medium as defined in claim 33 wherein one said pre-existence criterion for a call site is that the receiver expression refers to an immutable member of an object that meets a criterion from which it can be inferred during the calling procedure's compilation that the object to which receiver refers during any given execution of the calling procedure will have been constructed by the time the given execution commences.

39. A storage medium as defined in claim 33 wherein one said pre-existence criterion for a call site is that the receiver expression refers to an immutable member either of another immutable member or of an object that is referred to by an invariant local variable, where an immutable member is one that can be assigned only in a constructor, and an invariant local variable is defined as a local variable to which the calling procedure does not assign a value other than that of another invariant local variable.

40. A storage medium configured by machine-readable instructions to:

A) read electrical signals representing a source-code calling procedure that calls a target virtual method;

B) compile the source-code calling procedure into an object-code calling procedure by placing directly inlined code for each currently loaded form of the target virtual method into the object-code calling procedure;

C) record against the calling procedure and the target method the calling procedure's dependence on the current number of implementations of the target virtual method;

D) store the object-code calling procedure in a machine-readable storage medium;

E) thereafter read electrical signals representing a new form of a virtual method;

F) determine whether the new form overrides a virtual method against which the calling procedure's dependence on a given number of implementations has been recorded;

G) if so, recompile the source-code calling procedure into a replacement object-code calling procedure; and H) store the replacement object-code calling procedure in a machine-readable storage medium.

* * * * *

UNITED STATES PATENT AND TRADEMARK OFFICE
CERTIFICATE OF CORRECTION

PATENT NO. : 6,223,340 B1
DATED : April 24, 2001
INVENTOR(S) : David L. Detlefs

It is certified that error appears in the above-identified patent and that said Letters Patent is hereby corrected as shown below:

Column 10,
Line 11, replace "1's" with -- 11's --.

Signed and Sealed this

Twenty-seventh Day of November, 2001

Attest:

NICHOLAS P. GODICI
Attesting Officer     Acting Director of the United States Patent and Trademark Office